(12) United States Patent
Bhogal et al.

(10) Patent No.: US 7,088,462 B2
(45) Date of Patent: Aug. 8, 2006

(54) PRINT MANAGER HAVING A USER INTERFACE FOR SPECIFYING HOW DOCUMENTS ARE DIRECTED TO PRINT DEVICES

(75) Inventors: Kulvir Singh Bhogal, Fort Worth, TX (US); Nizam Ishmael, Jr., Austin, TX (US); Javid Jameossanaie, Austin, TX (US); Mandeep Singh Sidhu, Plfugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 910 days.

(21) Appl. No.: 09/895,093

(22) Filed: Jun. 29, 2001

(65) Prior Publication Data

US 2003/0002069 A1    Jan. 2, 2003

(51) Int. Cl.
*G06F 15/00* (2006.01)
(52) U.S. Cl. ....................... 358/1.15; 358/1.9
(58) Field of Classification Search ................ 358/1.1, 358/1.9, 1.13, 1.15, 400
See application file for complete search history.

(56) References Cited

U.S. PATENT DOCUMENTS

| 5,906,442 A | 5/1999 | Kishida ................ 400/61 |
| 5,978,559 A | 11/1999 | Quinion ................ 358/1.15 |
| 6,003,069 A | 12/1999 | Cavill ................ 709/205 |
| 6,064,838 A | 5/2000 | Maruta ................ 399/79 |
| 6,091,509 A | 7/2000 | Hickman et al. ........ 358/1.16 |
| 6,094,276 A | 7/2000 | Yamaguchi ............ 358/1.15 |
| 6,426,798 B1 * | 7/2002 | Yeung .................. 358/1.13 |
| 6,529,286 B1 * | 3/2003 | King ..................... 358/1.14 |
| 6,606,165 B1 * | 8/2003 | Barry et al. ............ 358/1.9 |
| 6,614,549 B1 * | 9/2003 | Hlava ................... 358/1.15 |

* cited by examiner

*Primary Examiner*—Gabriel Garcia
(74) *Attorney, Agent, or Firm*—Mark S. Walker; Streets & Steele; Jeffrey L. Streets

(57) ABSTRACT

An operating system provides an interface that allows the user to assign printers for use when a print job having one or more specific attributes has been submitted. The one or more specific attributes of a print job may include the identity of the application generating the print job, the file type being printed, one or more features of the print job, the presence or absence of color, the page size, the number of pages, the draft quality specified, the paper stock selected, and combinations thereof. The attributes of the print job are identified by the operating system after receiving the print job, and the print jobs are directed to the appropriate printer by looking up the identified attributes in user-customized printer assignments.

12 Claims, 6 Drawing Sheets

| ATTRIBUTE ⌐502 | OPTIONAL SECONDARY ATTRIBUTE ⌐504 | PRINTER ASSIGNED ⌐506 | OPTIONAL SECONDARY PRINTER ASSIGNED ⌐508 |
|---|---|---|---|
| COLOR | | INKJET1 | |
| COLOR | PHOTO | INKJET2 | LASERJET3 |
| NO COLOR | DPI<300 | LASERJET1 | LASERJET2 |
| NO COLOR | DPI>300 | LASERJET2 | |
| COLOR | PAGE>20 | LASERJET3 | |

PRINT MANAGER HAVING A USER INTERFACE FOR SPECIFYING HOW DOCUMENTS ARE DIRECTED TO PRINT DEVICES

BACKGROUND OF THE INVENTION

1. Field of the Invention

This invention generally relates to improvements in operating system software for printing documents, namely the identification and handling of print jobs on the basis of color content in the print jobs.

2. Description of the Related Art

One of the most important aspects of a modern computer system is the ability to generate a "hard" copy of textual information or graphics that can be manipulated by the computer, visually displayed and stored. In order to accomplish this task, a computer system generally includes one or more printing devices that are electrically connected to the computer system and controlled by it in order to generate a permanent image on a selected medium. Examples of printing devices in common use are dot matrix, ink jet and laser printers that fix permanent images on paper under control of the computer. Although paper is the most common medium, other media are often used, such as photographic film.

Print characteristics, such as resolution, number of colors and page size, may vary greatly from one print job to the next as a result of limitations of the application generating the print job, objectives of the user initiating the print job, and the capabilities of the available printers.

In order to print a document that is displayed on the monitor or stored within the memory, several actions must take place. First, since the print medium generally has a fixed size, the printable information must be divided into pieces that are small enough to fit on the selected medium, a process that is called pagination. In addition, the information may need to be reformatted from the format in that it is either displayed or stored into a format that is suitable for controlling the printing device to actually perform the printing on the medium. The reformatting in this latter step may include the insertion of control commands into the printable information in order to control the printing device. These added commands may, for example, include such commands as carriage returns, line feeds, form feeds, spaces and font information, that format the printable information. The reformatting may also include a conversion step in which a graphical display is converted into the form used by the printing device.

The pagination and reformatting necessary to convert the printable information into a form that can be printed on a given printing device is generally performed by software programs running within the computer system. Software programs operating on a computing system generally can be categorized as either operating systems or application programs. Operating systems are usually specific to a type of computer system and consist of a collection of utility programs that enable the computer system to perform basic operations, such as storing and retrieving information on a peripheral disk memory, displaying information on an associated video display, performing rudimentary file operations including the creation, naming and renaming of files and, in some cases, performing diagnostic operations in order to discover or recover from malfunctions.

By itself, the operating system generally provides only very basic functions and must be accompanied by an application program. The application program interacts with the operating system to provide much higher-level functionality and a direct interface with the user. During the interaction between the application program and the operating system, the application program typically makes use of operating system functions by sending a series of task commands to the operating system that then performs the requested tasks. For example, the application program may request that the operating system store particular information on the computer disk memory or display information on the video display.

Regardless of whether the printer software is provided by the application program, the operating system, or some combination, the functionality of the printer software, and consequently the functionality of the printer, has been limited. In particular, printer software has been substantially limited to addressing the basic communications of formatting and pagination for a particular printer, or the notification of printer status or print job status to the user. While these basic functions are useful or necessary, they do not provide the user with some desired print management capabilities.

Furthermore, a modern computer network may have access to a plurality of different print resources, each print resource having its own print settings that establish the features and characteristics of the print resources. It can be difficult, if not impossible, for a user to determine which print resource is the optimal one to print a particular document without actually performing a print operation. In addition, when print data are to be distributed and printed, optimal distributed print processing of the print data cannot often be performed.

U.S. Pat. No. 5,906,442 discloses a method for automatically setting an optimal print environment for print data in a print control apparatus without making the user recognize it. The method includes outputting data to a plurality of print control apparatuses via a network, analyzing test data on the basis of print setting information, obtaining analysis results of test data from a plurality of print control apparatuses, comparing each of the analysis results obtained, and selecting one of the plurality of print control apparatuses which is an optimal print control apparatus for printing the data to be outputted. This "querying" process consumes valuable network resources, since at least a portion of each print job is sent to each print control apparatus accessible over the network and analysis results must be returned and compared before a print control apparatus can be selected.

A Xerox Disclosure Journal article to P. F. Morgan (vol. 16, No. 6, November/December 1991) entitled "Integration of Black Only and Color Printers" delivers portions of a job to a plurality of printers on the basis of page level information. In particular, a job is separated on the basis of color so that the black/white part of the job is delivered to a black/white printing system and the color part of the job is delivered to a full process color machine.

Therefore, there is a need for a method or system providing more print management capabilities. It would be desirable to have a method or system that identifies one or more attributes of a print job or a portion of a print job and directs the print job to an appropriate print device. More particularly, it would be desirable to have an operating system that accommodates user preferences for determining how print jobs are distributed to a plurality of printers. It would be most desirable if the operating system allowed for document type instructions, file type instructions, and identification of color content.

SUMMARY OF THE INVENTION

The present invention provides a method for selecting a printer for printing a print job. The method comprises identifying one or more attributes of the print job and directing, using user-defined instructions, the print job to a printer capable of handling the one or more attributes. Preferably, the print jobs are generated using one or more application programs running in a computer that is in communication with the printer. The one or more attributes are selected from file type, application identity, color content, print resolution, page size and combinations thereof. Optionally, the method further comprises entering the user-defined instructions through a graphical user interface. More particularly, the method may further comprise identifying the available printers and assigning one or more of the available printers for use with print jobs having the one or more attributes. The user-defined instructions are preferably then stored in memory, perhaps in the form of a table or database, for access by the printer handler.

The foregoing and other objects, features and advantages of the invention will be apparent from the following more particular description of a preferred embodiment of the invention, as illustrated in the accompanying drawings wherein like reference numbers represent like parts of the invention.

DETAILED DESCRIPTION

Figure 1:
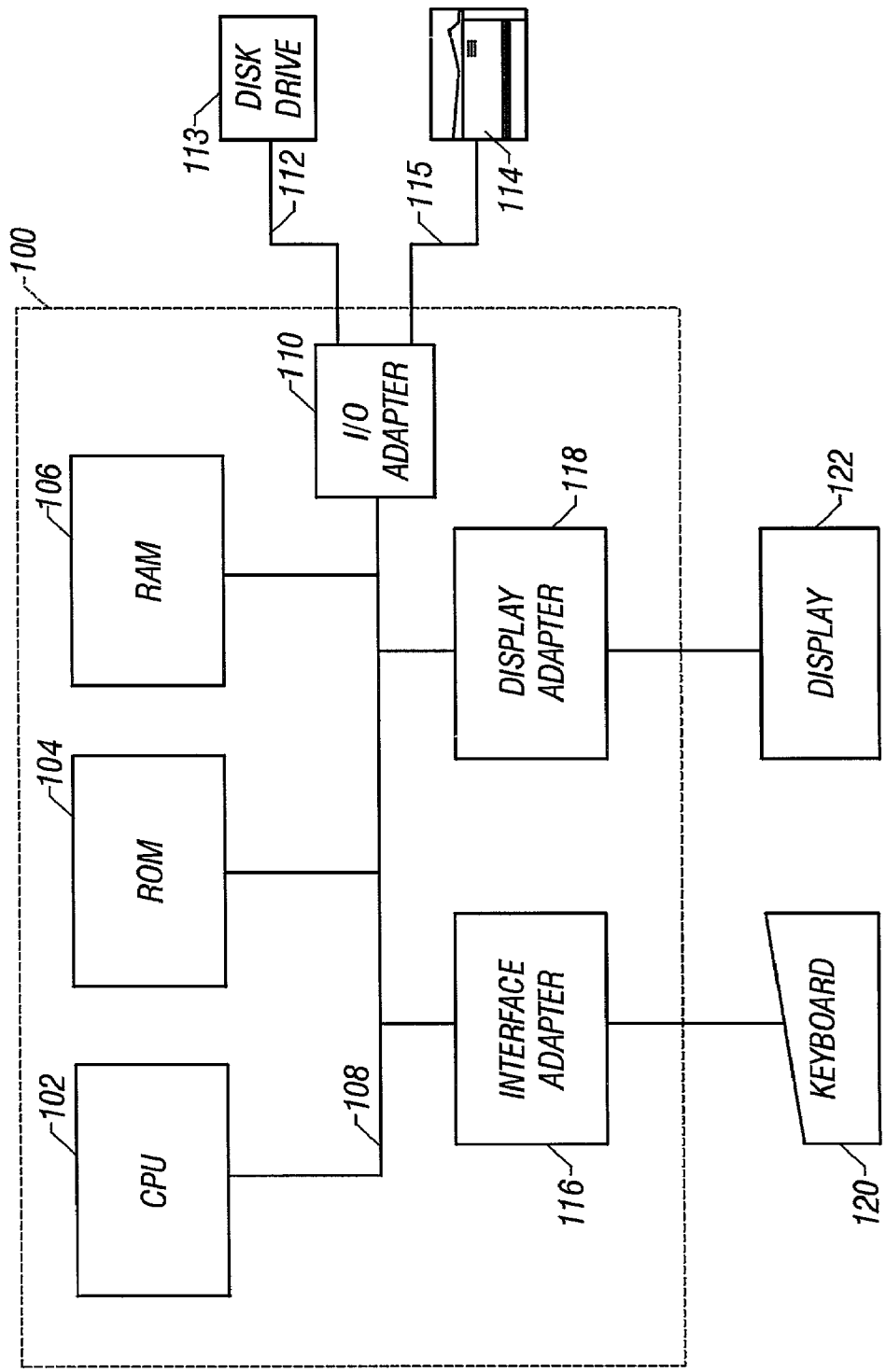
FIG. 1 is a block diagram of a computer system on which the present invention may be carried out.

FIG. 1 is a block diagram of a personal computer, such as the IBM PS/2 or Macintosh computer, having a typical hardware configuration that is suitable for carrying out the present invention. The computer 100 is controlled by a central processing unit 102, which may be a conventional microprocessor; a number of other units, all interconnected via a system bus 108, are provided to accomplish specific tasks. Although a particular computer may only have some of the units illustrated in FIG. 1 or may have additional components not shown, most computers will include at least the units shown.

Specifically, computer 100 includes a random access memory (RAM) 106 for temporary storage of information, a read only memory (ROM) 104 for permanent storage of the computer's configuration and basic operating commands and an input/output (I/O) adapter 110 for connecting peripheral devices such as a disk unit 113 and printer 114 to the bus 108, via cables 112 and 115, respectively. A user interface adapter 116 is also provided for connecting input devices, such as a keyboard 120, and other known interface devices including mice, speakers and microphones to the bus 108. Visual output is provided by a display adapter 118 that connects the bus 108 to a display device 122 such as a video monitor. The workstation is controlled and coordinated by an operating system resident on the workstation. An example of this operating system is the Microsoft Windows® operating system.

Figure 2:
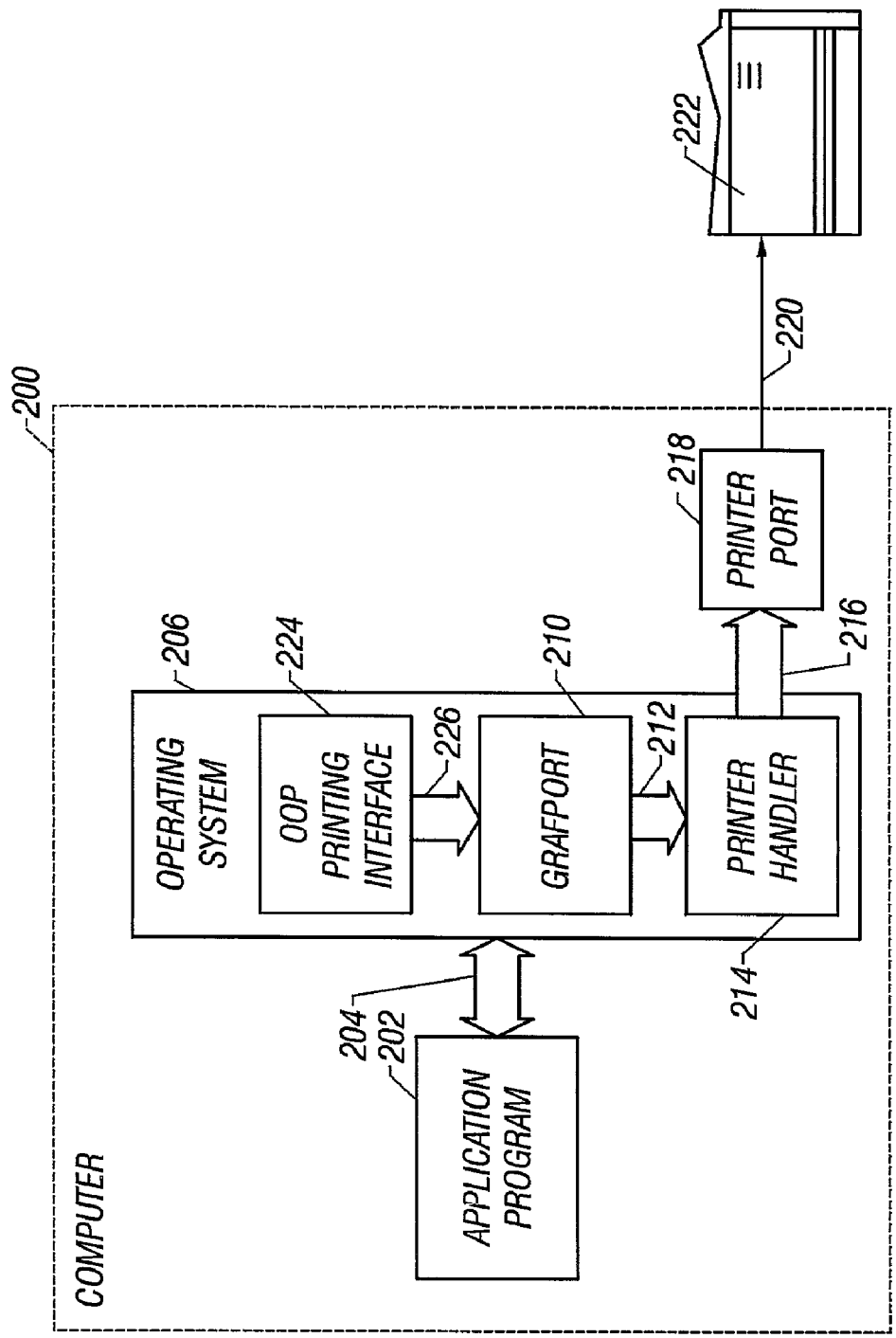
FIG. 2 is a block diagram of modified computer system in which the operating system controls operation of a print device.

FIG. 2 shows a schematic overview of a computer system, shown generally as a dotted box 200, having an application program 202 and an operating system 206 to control and coordinate the operations of the computer. Application program 202 communicates with operating system 206 as indicated by arrow 204 to print information. This dual program system is used on many types of computers systems ranging from mainframes to personal computers. While the exact manner in which an operating system handles print jobs may vary between operating systems, the operating system illustrated in FIGS. 2 and 3 is a suitable example and should not be taken as limiting the scope of the invention.

The printing interface 224 responds to a series of simple commands generated by application program 202 in order to perform various formatting and pagination functions. The formatted, printable information is then transmitted to a grafport 210 as indicated schematically by arrow 226. While it is possible for application program 202 to communicate directly with grafport 210, it is not contemplated that most applications will do this unless special procedures are needed.

In any case, the information flows through grafport 210, and as indicated by arrow 212, is provided to a printer handler 214. Printer handler 214 is similar to what is known in the art as a "printer driver". However, the printer handler is "intelligent" and offers some additional capabilities that will be described herein. Essentially, printer handler 214 processes the incoming data stream indicated by arrow 212 and adds the necessary printer commands to control the associated printer schematically illustrated as printer 222. The reformatted data is provided, as indicated by arrow 216, to a printer port 218 that converts the data into electrical signals that are sent over cable 220 to printer 222. Printer 222 usually contains an "imaging engine" which is a hardware device or a ROM-programmed computer which takes the incoming information stream and converts it into the electrical signals necessary to drive the actual printing elements. The result is a "hard copy" output on the selected medium.

Figure 3:
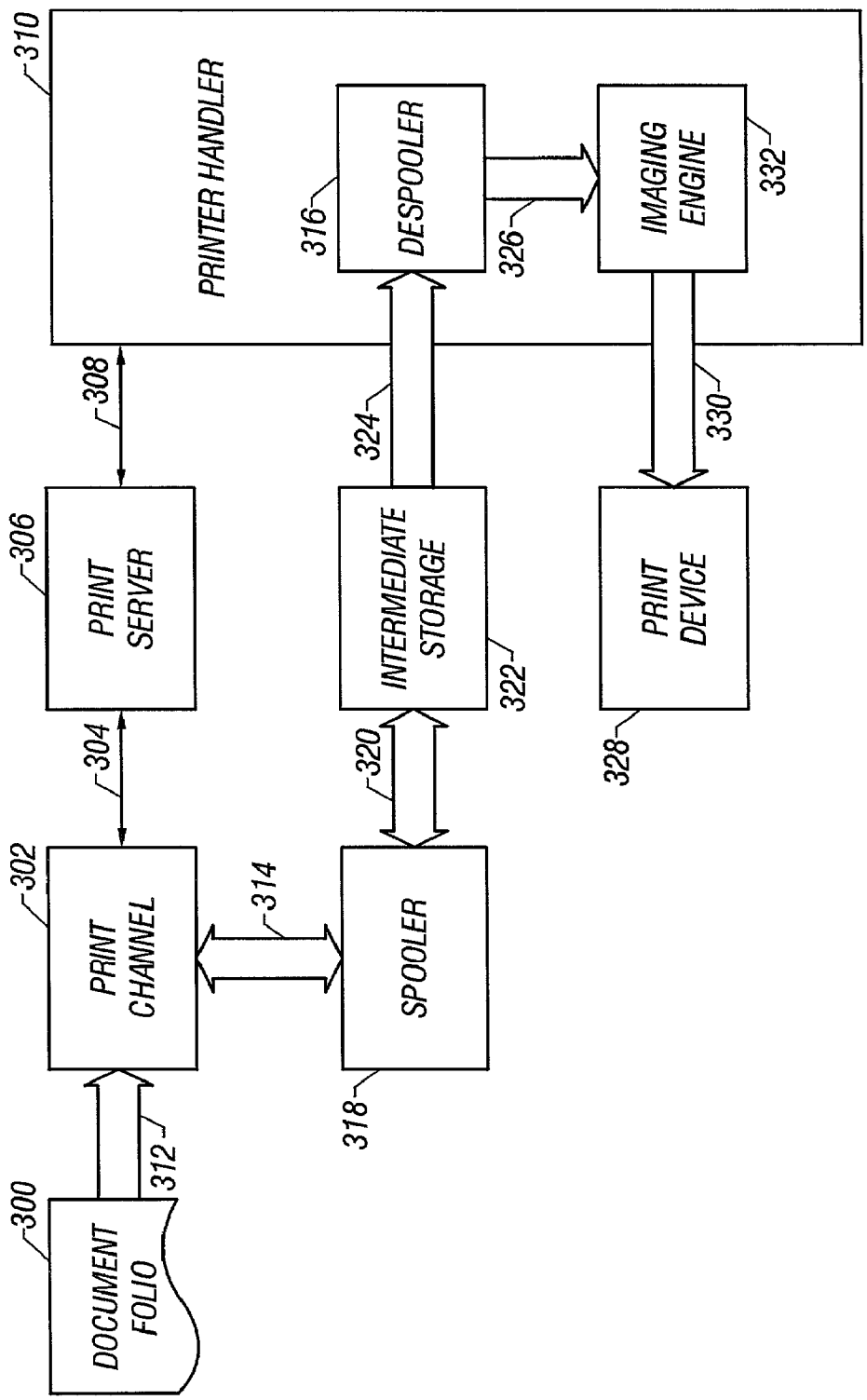
FIG. 3 is a block diagram of the information paths by which a print job is channeled to a print device.

The actual mechanism by which a document generated by the printing interface 224 is transmitted to printer 222 is shown in more detail in FIG. 3. In particular, printing interface 224 (as will hereafter be described in detail) generates an entity called a document folio shown schematically as document folio 300 in FIG. 3. The document folio may consist of text, graphics or a combination of the two, all formatted and arranged in a manner specified by the application program. The document folio information is provided, as indicated by arrow 312, to a print channel 302. Print channel 302 is an object that is created to transport the information to an appropriate printer. Print channel uses a print job description and a printer identification provided by the application program to transmit the printable information to the appropriate printer.

More specifically, after the print channel 302 receives a printing job, it transmits the printable information to a spooler program 318 as indicated by arrow 314. Spooler 318 receives the incoming information stream and stores it, in incoming order, in an intermediate storage location 322 as indicated by arrow 320. Print channel 302 then sends a notification to a print server program 306 via a link 304, which notification informs print server program 306 that a new print job exists. The print server program 306 is a standard program that monitors all print jobs that have been created and also checks the available printers to determine their status.

Once a print job has been completely spooled or stored in intermediate storage 322, the print server 306 notifies a printer handler 310 by means of a link 308. The printer handler 310 is a type of printer driver that controls and drives a specific printer. The printer handler's purpose is to convert text and graphic information into printer readable form for any particular printer type. Typically, a printer handler can only process one print job and any other jobs that are created and directed towards the associated printer are queued for later processing. The printer handler contains a despooler program 316 that retrieves the spooled data from intermediate storage 322 (as indicated by arrow 324) and provides the information, as indicated by arrow 326, to an imaging engine 332. The imaging engine 332 converts the incoming data stream into the command signals that are necessary to drive the printing elements to produce the final printed document. The commands, indicated schematically by arrow 330, are provided to the actual print device indicated by box 328 for printing.

Once a print job is completely printed, the printer handler 310 checks its queue for another print job and, if a job is present, begins processing it. Alternatively, if there are no new print jobs to process, the printer handler becomes inactive. After a particular print job is completed, the information stored in intermediate storage in 322 is deleted and the storage is reclaimed. As an option, the storage can be retained until a user explicitly deletes the storage.

The desktop printer is the only user visible part of the printer. All user actions (commands) related to the printer are handled by the operating system. When a document is to be printed, it is dragged to the printer icon (or the Print item is selected from the system wide menu). This starts the printing process by first spooling the document by packaging it as a print job. Spooling is a process of streaming the graphic description of a document to the disk so it can be imaged later (possibly in a different task) to the actual printing device represented by the desktop printer. The spooled print job is stored in the printer's persistent data that consists mainly of the print job queue and the printer's dynamic configuration. After the print job is spooled, the printer handler is sent a message that there is a print job for it to process. The printer handler picks up the print job, despools it, converts it to the printer's native imaging model and sends it to the printer.

There is one printer handler task per physical printer. The printer handler consists of a dispatcher and an imaging task. The dispatcher is a task that handles requests to print jobs and sends them to the imaging task so that the server task is free to handle other requests (more print jobs, status queries, notification, etc.). The printer handler architecture allows for more than one task working on print jobs. Instead of having only one imaging task, the printer handler dispatcher can have a pool of tasks that access the job queue and pick up a job to process. This way, the printer handler can be processing multiple jobs at the same time. If the target printer can accept only one job at a time, only one imaging task will be talking to it at a given time. The multiple imaging tasks model works well when the destination is a spooler that can accept more than one job at a time. Each job in the queue knows the task that is processing it so that functions like "abort" and "pause" will operate properly.

Referring still to FIG. 3, the imaging engine 332 of the printer handler 310 for a particular printer receives one job at a time. The printer handler uses the developer customizable imaging engine 332 to convert the source description of the document into a stream of data targeted for the particular print device 328 that the printer handler is associated with. The imaging engine 332 obtains a spool stream from the print job and passes it to the printer device object 328. The printer device extracts individual pages out of the print run and converts the individual pages into the printer's imaging model. The imaging objects also perform the task of mapping the attributes requested by the print job (page size, media, color, fonts, etc.) to features actually available on the printer. This processing is achieved by consulting the printer's dynamic state maintained by the printer handler 310.

The printer handler is typically responsible for keeping track of the printer's persistent data, in particular, its job queue and dynamic state. The dynamic state contains things like the current media/tray setting, current color mode (2, 3 or 4 colors), etc. The printer state, which is part of the printer model's store, is updated when the printer handler images a job to it and finds that the state has changed. This scheme works when the printer handler has two-way communication available with the printer. In cases when two-way communication is not available, the printer handler will rely on the printer's static configuration.

Networked printers are basically the same as a local printer except that the communications channel must use a specific network protocol. The present invention can be implemented on printers using protocols based on NPA (Network Printing Architecture), TCP/IP, PAP protocol, and Novell IPX based print servers.

In accordance with the present invention, the operating system provides an interface, preferably a graphical user interface, which allows the user to custom assign printers for use when a print job having one or more specific attribute has been submitted. The one or more specific attributes of a print job may include, without limitation, the identity of the application generating the print job, the file type being printed, one or more features of the print job, the presence or absence of color, the page size, the number of pages, the draft quality specified, the paper stock selected, and combinations thereof. The attributes of the print job are identified by the operating system after receiving the print job, and the print jobs are directed to the appropriate printer by looking up the identified attributes in the user-customized printer assignments.

Figure 4:
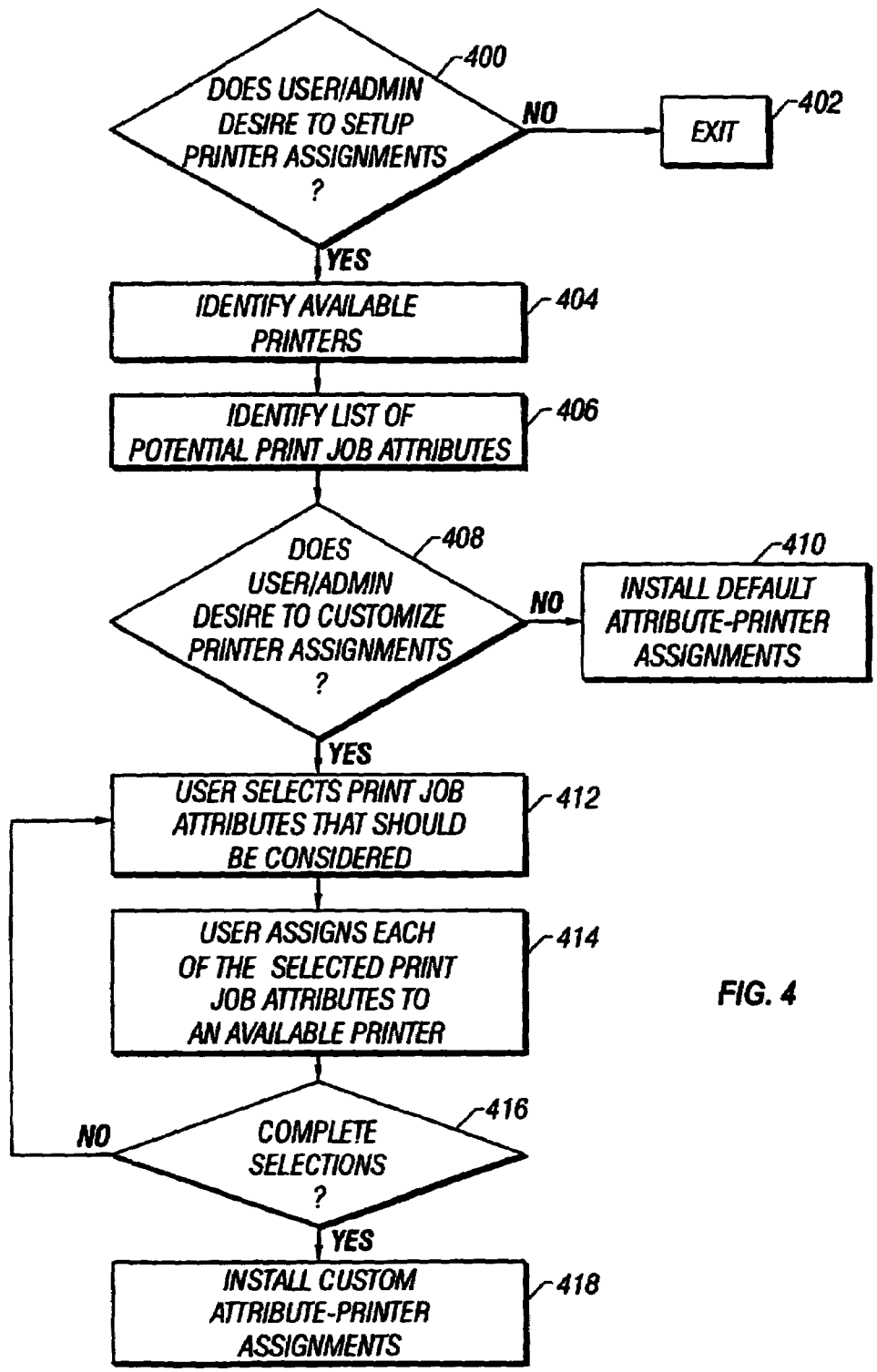
FIG. 4 is a flowchart illustrating the steps of pausing a first print job or advancing a second print job in accordance with a preferred embodiment.

FIG. 4 is a flowchart illustrating steps executed by the operating system to select print job attributes that shall be used to select an available printer and to assign an available printer to each of the selected print job attributes. In state 400, the operating system determines whether the user or system administrator desires to setup printer assignments. If the user does not desire to setup printer assignments, then the process exits in state 402. To setup printer assignments, state 404 identifies the printers that are available to the computing system, such as a network. In state 406, the operating system identifies a list of potential print job attributes, which list may be a standard list. In state 408, it is determined if the user or system administrator desires to customize printer assignments or proceed to state 410 where default attribute-printer assignments are made or installed. In state 412, the customized printer assignments begin by allowing the user to select the print job attributes that are desired to be used as the basis for routing print jobs to the printers. In state 414, the user assigns an available printer to each of the selected print job attributes or combinations of attributes. The process of states 412 and 414 continues until the user indicates in state 416 that the attribute selections are complete. In state 418, the operating system then installs the custom attribute-printer assignments for use by the printer handler in routing print jobs to the available printers in a manner consistent with the user setup.

In a further embodiment, a special attribute bit, such as a color bit, is generated, either by the application program or the printer handler, to indicate that the print job includes a particular print job attribute, such as color, that should determine a suitable printer or printer handler for assigning to the print job. By monitoring print jobs for this color bit, each printer can determine whether it is suitable to handle the print job without having to analyze large portions of the print job. While there may be more than one printer on a network that can print color pages and therefore will accept print jobs having the color bit, the invention assures that the print job is printed on a suitable printer rather than a printer that will only print black and white images. By way of example, the special attribute bit may be a color bit where the value (1) indicates that the print job contains color images and the value (0) indicates that the print job is merely black and white.

In one embodiment of the invention, the print job is provided with a plurality of special attribute bits that each indicate the existence of a different print job attribute in the print job. For example, there were two special attribute bits associated with a print job, the first attribute bit could indicate color and the second attribute bit could indicate the resolution or dots per inch (dpi) required by the image. In this manner, drafts of spreadsheets using the color red to signify negative number values could be assigned to a low resolution, high-speed color printer, while digital photographs could be assigned to a high-resolution color printer loaded with special paper stock.

In one embodiment, the identifiable print job attributes that the user has specified as providing the basis for assigning printers are collected in a look-up table or database. Each record in the database will include a print job attribute, or combinations of print job attributes, that are intended to cause the relevant print job to be sent to a specific printer. Each record in the database will also include a specific printer, or combination of printers, that may receive the relevant print job. The resulting database is installed as part of the printer handler that routes print jobs to appropriate printers.

Figure 5:
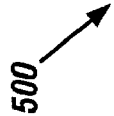
FIG. 5 is a table illustrating an exemplary database file structure that the printer handler would utilize for routing print jobs to the available printers.

FIG. 5 is a table illustrating a one embodiment of a database file structure that the printer handler would utilize for routing print jobs to the available printers. The database 500 includes four fields: field 502 for the attribute identification, optional field 504 for a secondary attribute identification, field 506 for the printer assigned to the attribute, and an optional field 508 for a secondary printer assignment. The database table 500 is illustrated containing 5 records that primarily look for a color/no color attribute, but secondarily identifies if the color print job is a photo (possibly indicated by a special attribute bit) or exceeds a page size limitation and if the non-color print jobs have a resolution of greater than or less than a given dots per inch setpoint. For example, a print job identified as containing a color photo would be sent to the inkjet printer #2, unless it was offline, in which case the print job could be forwarded to the color laserjet #3.

It should be recognized that in a given business environment, a different combination of special attribute bits may be most desirable. Accordingly, the user interface of the present invention allows the user or system administrator to select the number of attribute bits to be used and the combination of attribute bits that will be utilized.

Once generated, the attribute bits for a particular print job may be stored in the print queue in association with the print job. In turn, the print manager will direct the print job to an appropriate printer on the basis of the attribute bits. Consequently, in one embodiment of the invention, the attribute bits form a temporary file that is deleted as soon as the print job has been sent on to a printer or printer handler. Accordingly, this process can take place entirely resident within the operating system, where the assignment of available printers to print jobs having certain attributes is preferably customizable by the user through a graphical user interface.

Figure 6:
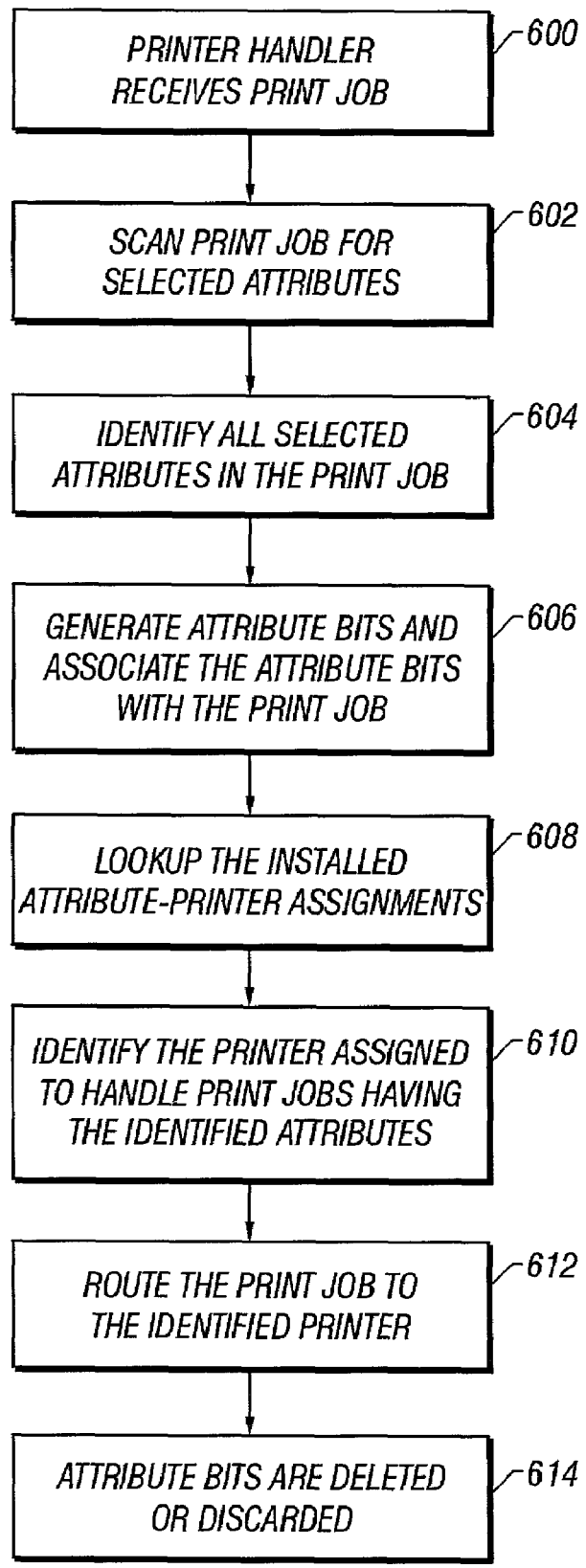
FIG. 6 is a flowchart illustrating the steps for associating the selected attribute bits in a print job with a printer identified as having the targeted capabilities in accordance with a preferred embodiment.

FIG. 6 is a flowchart illustrating the steps performed by the operating system. In state 600, the printer handler portion of the operating system receives a print job. In state 602, the print job is scanned or analyzed for selected print job attributes. In state 604, all of the selected attributes that are in the print job are identified. In state 606, attribute bits are generated for each of the identified attributes of the print job and these attribute bits are associated with the print job. In state 608, the printer handler performs a look-up in the installed attribute-printer assignments, which may be default assignments or customized assignments. In state 610, the printer handler identifies the printer assigned to handle print jobs having the identified attributes. In state 612, the printer handler routes the print job to the identified printer. Finally, in state 614 the attribute bits, having served their purpose, are deleted or discharged.

A further optional feature of the invention is a notification sent to the computer from which the print job originated, notifying the user of that computer about what printer the printer handler has decided to send the print job to. The notification may also include an acknowledgement button requiring that the user acknowledge the destination of the print job or an optional instruction button to override the printer destination selected by the printer handler in favor of a manually selected printer.

It will be understood from the foregoing description that various modifications and changes may be made in the preferred embodiment of the present invention without departing from its true spirit. It is intended that this description is for purposes of illustration only and should not be construed in a limiting sense. The scope of this invention should be limited only by the language of the following claims.

What is claimed is:

1. A method for selecting a printer for printing a print job, the method comprising:
   identifying one or more attributes of the print job;
   associating an attribute bit setting for each of the one or more identified attributes;
   matching the one or more attribute bit settings of the print job with attributes listed in an attribute-printer assignment table;
   identifying the printer from the attribute-printer assignment table designated to handle print jobs having the matching one or more attribute bit settings; and
   directing the print job to the identified printer.

2. The method of claim 1, further comprising:
   generating the plurality of print jobs using one or more application programs running in a computer that is in communication with one or more printers.

3. The method of claim 1, wherein the one or more attributes are selected from file type, application identity, color content, print resolution, page size or combinations thereof.

4. The method of claim 1, wherein the attribute-printer assignment table comprises a list of available printers and the attributes associated with each of the available printers, the method further comprising:
   entering the list of available printers and the attributes associated with each of the available printers through a graphical user interface.

5. The method of claim 1, wherein the attribute bit setting for each of the one or more identified attributes is set by an application program or a printer handler.

6. The method of claim 5, further comprising:
   storing the attribute-printer assignment table in memory for access by the printer handler.

7. A computer program product including instructions embodied on a computer readable medium for selecting a printer for printing a print job, the instructions comprising:
   identifying instructions for identifying one or more attributes of the print job;
   associating instructions for associating an attribute bit setting for each of the one or more identified attributes;
   matching instructions for matching the one or more attribute bit settings of the print job with attributes listed in an attribute-printer assignment table;
   identifying instructions for identifying the printer from the attribute-printer assignment table designated to handle print jobs by having the matching one or more attribute bit settings; and
   directing instructions for directing the print job to the identified printer.

8. The computer program product of claim 7, further comprising:
   generating instructions for generating the plurality of print jobs, wherein the generating instructions are capable of running one or more application programs in communication with one or more printers.

9. The computer program product of claim 7, wherein the one or more attributes are selected from file type, application identity, color content, print resolution, page size or combinations thereof.

10. The computer program product of claim 7, wherein the attribute-printer assignment table comprises a list of available printers and the attributes associated with each of the available printers, the computer program product further comprising:
    entering instructions for entering the list of available printers and the attributes associated with each of the available printers through a graphical user interface.

11. The computer program product of claim 10, wherein the attribute bit setting for each of the one or more identified attributes is set by an application program or a printer handler.

12. The computer program product of claim 11, further comprising:
    storing instructions for storing the attribute-printer assignment table in memory for access by the printer handler.

* * * * *